United States Patent
Beckman

(10) Patent No.: US 10,727,737 B2
(45) Date of Patent: Jul. 28, 2020

(54) SYSTEM AND METHOD FOR USING SOLENOID FLYBACK TO PROVIDE A LOW VOLTAGE SOLENOID DRIVER POWER SUPPLY

(71) Applicant: WOODWARD, INC., Fort Collins, CO (US)

(72) Inventor: Dale A. Beckman, Fort Collins, CO (US)

(73) Assignee: WOODWARD, INC., Fort Collins, CO (US)

( * ) Notice: Subject to any disclaimer, the term of this patent is extended or adjusted under 35 U.S.C. 154(b) by 407 days.

(21) Appl. No.: 15/699,558

(22) Filed: Sep. 8, 2017

(65) Prior Publication Data
US 2019/0081557 A1    Mar. 14, 2019

(51) Int. Cl.
| | |
|---|---|
| H02M 3/06 | (2006.01) |
| H01F 7/06 | (2006.01) |
| H02M 3/156 | (2006.01) |
| H02M 1/00 | (2006.01) |
| H02M 3/155 | (2006.01) |

(52) U.S. Cl.
CPC ............. *H02M 3/06* (2013.01); *H01F 7/064* (2013.01); *H02M 3/156* (2013.01); *H02M 2001/0006* (2013.01); *H02M 2003/1555* (2013.01)

(58) Field of Classification Search
CPC .......... H02M 3/06; H02M 3/156; H02M 2001/0006; H02M 2003/1555; H01F 7/064
USPC ........................................... 361/190
See application file for complete search history.

(56) References Cited

U.S. PATENT DOCUMENTS

| | | | | |
|---|---|---|---|---|
| 5,412,378 | A * | 5/1995 | Clemens | B60R 25/04 180/287 |
| 6,175,484 | B1 | 1/2001 | Caruthers et al. | |
| 6,207,045 | B1 | 3/2001 | Jiang | |
| 6,948,461 | B1 * | 9/2005 | Kotwicki | F01L 9/04 123/90.11 |
| 7,154,729 | B2 * | 12/2006 | Tanzawa | F02D 41/20 361/156 |
| 2008/0218928 | A1 * | 9/2008 | Baek | H01H 47/325 361/143 |
| 2009/0138130 | A1 * | 5/2009 | Aigner | B60R 16/03 700/282 |
| 2014/0174405 | A1 * | 6/2014 | Adachi | F02M 51/06 123/472 |

* cited by examiner

*Primary Examiner* — Kevin J Comber
(74) *Attorney, Agent, or Firm* — McAndrews, Held & Malloy, Ltd.

(57) ABSTRACT

A solenoid system includes a solenoid, a primary power source, solenoid control circuitry, flyback charging circuitry, and voltage regulator circuitry. The primary power source is configured to provide a primary voltage to at least the solenoid. The solenoid control circuitry is configured to control current provided to the solenoid. The solenoid generates a flyback voltage spike each instance the current provided to the solenoid is interrupted as controlled by the solenoid control circuitry. The flyback charging circuitry is configured to charge in response to each instance of the flyback voltage spike. The voltage regulator circuitry is configured to provide a regulated supply voltage from the flyback charging circuitry to the solenoid control circuitry if the flyback charging circuitry is charged to a secondary voltage that is greater than the primary voltage.

20 Claims, 3 Drawing Sheets

SYSTEM AND METHOD FOR USING SOLENOID FLYBACK TO PROVIDE A LOW VOLTAGE SOLENOID DRIVER POWER SUPPLY

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD

Certain embodiments are related to solenoids and solenoid control circuitry. More specifically, various embodiments provide flyback charging circuitry configured to provide power to solenoid driver circuitry using captured flyback voltage spikes created when a solenoid is switched off.

BACKGROUND

A solenoid is a device that converts electrical energy into mechanical work. Solenoids are constructed of a free moving steel plunger that sits within one or more wound coils of copper wire. When electric current is introduced, a magnetic field forms that draws the plunger in. The exposed end of the plunger can be attached to equipment and when the solenoid is activated, the plunger moves to open, turn on, or turn off that equipment. Solenoids are used for operating engine run/stop levers, throttles, chokes, valves and clutches and to protect expensive diesel engines from overspeed conditions, low lube pressure, and high temperature. Dual coil solenoids use two separate coil windings to allow the solenoid to be held energized for long periods of time without overheating. The first wound coil (pull coil) operates at a high current level to provide maximum pull or push. The second wound coil (hold coil) holds the plunger in place after it has completed its stroke.

Some solenoids include a mechanical switch having mechanical contacts that open when energized to disconnect from the pull coil after the plunger has been retracted. The mechanical contacts may include bushings that have a tendency to burn out. Electronically pulse width modulated driven solenoids eliminate the need for the mechanical switch and its associated problems and eliminate the need for the second hold coil. Instead, the electronically driven solenoids include solenoid driver circuitry that typically has a 4.5 Volt to 5.0 Volt minimum operating voltage requirement. Low cost voltage regulators that provide the battery voltage to the integrated circuit typically have a 0.7 Volt to 1.0 Volt voltage drop. Accordingly, if a battery voltage is run down under 5.2 Volts to 6.0 Volts, the solenoid driver circuitry may stop functioning and the solenoid may shut down. Preventing solenoid shut down by using larger battery voltages or voltage regulators having lower voltages drops to achieve solenoid driver circuitry minimum operating voltage requirements may be expensive and can take up valuable space, precluding these options from being commercially viable.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Flyback charging circuitry configured to provide power to solenoid driver circuitry using captured flyback voltage spikes created when a solenoid is switched off is provided, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
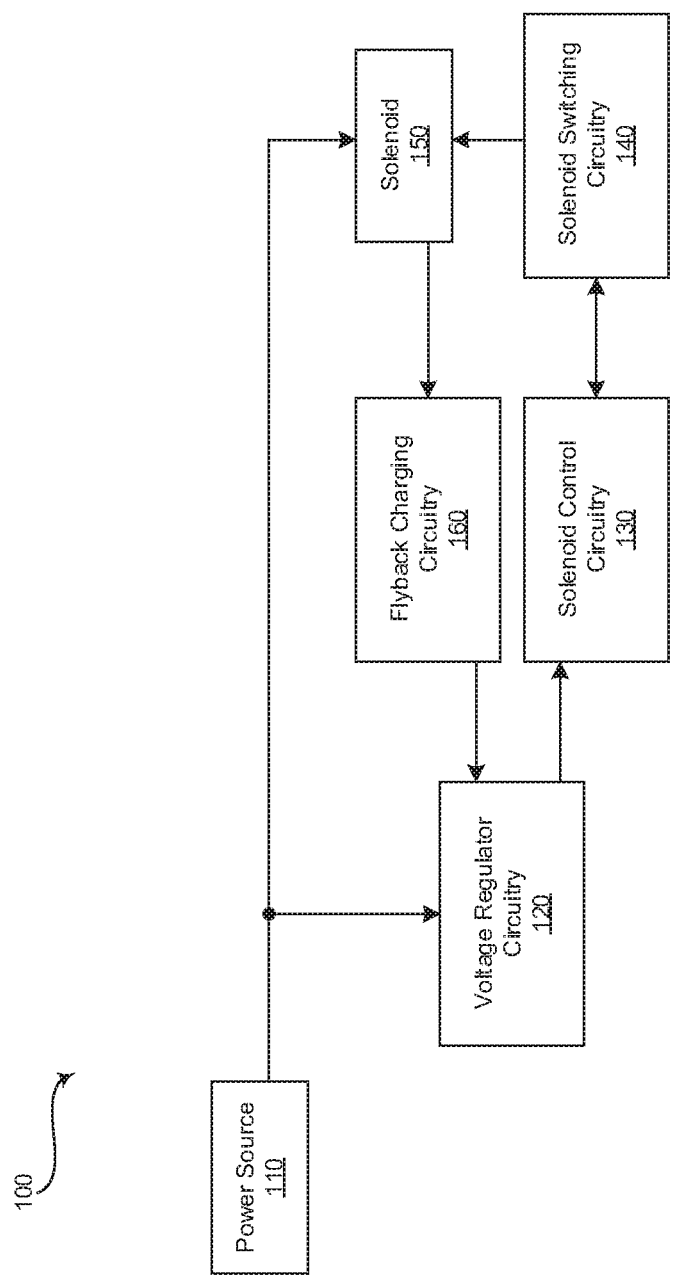
FIG. 1 is a block diagram of an exemplary solenoid system using solenoid flyback to provide a solenoid driver power supply in accordance with various embodiments.

Certain embodiments may be found in an electrically-powered solenoid system 100. More specifically, certain embodiments provide a solenoid system 100 comprising a solenoid 150 driven by solenoid control circuitry 130 via solenoid switching circuitry 140. The solenoid system 100 includes flyback charging circuitry 160 configured to capture flyback voltage spikes created each time the solenoid 150 is switched off, for example, as the solenoid is being driven 150 by the solenoid control circuitry 130 using pulse width modulation. The flyback charging circuitry 160 that is charged by the flyback voltage spikes may provide power to the solenoid control circuitry 130 if the flyback charging circuitry 160 is charged to a greater voltage than the supply voltage of a primary power source 110, such as a battery. Aspects of the present disclosure have the technical effect of enabling the solenoid control circuitry 130 to operate at battery 110 voltages at or below the minimum turn off voltage of the solenoid control circuitry 130.

As used herein, an element recited in the singular and proceeded with the word "a" or "an" should be understood as not excluding the plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Although certain embodiments in the foregoing description may be described in connection with a 12 Volt engine run/stop solenoid, for example, unless so claimed, the scope of various aspects of the present disclosure should not be limited to 12 volt power sources and/or run/stop solenoids and may additionally and/or alternatively be applicable to any suitable power source voltage and any suitable solenoid type. For example, the power source may be a 4.5 volt battery or any suitable battery voltage. As another example, the solenoid may be a type used for operating engine throttles, chokes, valves, clutches, protecting engines from overspeed conditions, low lube pressure, high temperature, and/or any suitable solenoid type.

FIG. 1 is a block diagram of an exemplary solenoid system 100 using solenoid flyback to provide a solenoid driver 130 power supply in accordance with various embodiments. Referring to FIG. 1, the solenoid system 100 comprises a power source 110, voltage regulator circuitry 120, solenoid control circuitry 130, solenoid switching circuitry 140, a solenoid 150, and flyback charging circuitry 160. The power source 110 may be a battery, such as a 12 volt battery, 4.5 volt battery, or any suitable battery voltage and/or battery type. The power source 110 may provide a direct current (DC) voltage to the solenoid 150 and the voltage regulator circuitry 120. The power source 110 may be configured to provide and/or stop providing the voltage in response to a received control signal. For example, the control signal may correspond with an activation of a button or switch at a vehicle or generator control panel that corresponds with starting or stopping an engine of the vehicle or generator.

The voltage regulator circuitry 120 is configured to receive the DC voltage from the power source 110 or the flyback charging circuitry 160 and provide a constant voltage level as an input to the solenoid control circuitry 130. The voltage regulator circuitry 120 may be configured to use the larger voltage from the power source 110 or the flyback charging circuitry 160. For example, at initial startup, the voltage from the power source 110 may be greater than the voltage at the flyback charging circuitry 160. The voltage regulator circuitry 120 may use the voltage from the flyback charging circuitry 160 once the flyback charging circuitry 160 is charged to a voltage greater than the power source 110.

The solenoid control circuitry 130, also referred to as a solenoid driver, is configured to drive the solenoid 150. For example, the solenoid driver 130 may provide a considerable amount of voltage and current at start-up to enable the solenoid 150 to pull in the plunger of the solenoid 150. The solenoid driver 130 may provide less current once the plunger is pulled-in to hold the plunger of the solenoid 150 in the pulled-in position. The solenoid control circuitry 130 may control the current provided to the solenoid 150 using pulse width modulation. For example, the solenoid control circuitry 130 may provide digital pulse width modulation signals to the solenoid switching circuitry 140 for switching the solenoid switching circuitry 140 on and off. The amount of time the solenoid switching circuitry 140 is turned on corresponds with the amount of current provided to the solenoid 150. For example, a longer amount of time that the solenoid switching circuitry 140 is turned on corresponds with a greater amount of current provided to the solenoid 150.

The solenoid switching circuitry 140 may provide sensed current feedback to the solenoid control circuitry 130. The solenoid control circuitry 130 may compare the sensed current feedback with current thresholds to determine when to provide the pulse width modulation signals for turning on and/or off the solenoid switching circuitry 140. For example, the solenoid driver 130 may provide a turn off pulse width modulation signal to the solenoid switching circuitry 140 when the sensed current feedback reaches a predetermined upper current threshold. The solenoid driver 130 may provide a turn on pulse width modulation signal to the solenoid switching circuitry 140 after a predetermined period of time and/or when the sensed current feedback reaches a predetermined lower current threshold.

The solenoid 150 may be an electromechanical solenoid having one or more electromagnetically inductive coils wound around a steel or iron armature or plunger that moves linearly into and out of the center of the coil(s). In various embodiments, the solenoid 150 may be an engine run/stop solenoid configured to enable airflow to an engine in a run state and to cut off airflow to the engine in a stop state. The solenoid 150 may receive a high current via the solenoid driver 130 and solenoid switching circuitry 140 at startup to facilitate the pulling of the plunger linearly into the coils to open the airflow to the engine. The solenoid driver 130 may reduce the amount of current provided to the solenoid 150 via the switching circuitry 140 to a level that enables the solenoid 150 to hold-in the plunger while reducing energy consumption and preventing overheating. The solenoid driver 130 reduces the current provided to the solenoid 150 by turning the switching circuitry 140 on and off at intervals using, for example, pulse width modulation signals. The solenoid 150 energizes when the switching circuitry 140 is closed and current is being provided to the solenoid 150. When the switching circuitry 140 is opened, the solenoid 150 attempts to resist the sudden drop of current by using its stored magnetic field energy to create its own voltage. The voltage created by the solenoid 150 is a sudden voltage spike seen across the inductive load of the solenoid when the supply current is interrupted. The sudden voltage spike may be referred to as a flyback voltage spike, inductive spike, and/or transient spike, among other things.

The flyback charging circuitry 160 is configured to capture the flyback voltage spike created by the solenoid 150 each time the current being provided to the solenoid 150 is interrupted by the solenoid switching circuitry 140 as controlled by the solenoid driver circuitry 130. Each time the switching circuitry 140 turns off and the solenoid generated the flyback voltage spike, the voltage stored at the flyback charging circuitry 160 may increase. The voltage regulator 120 may use the voltage stored at the flyback charging circuitry 160 to power the solenoid driver circuitry 130 once the flyback charging circuitry 160 is charged to a voltage greater than the voltage provided by the power source 110. In various embodiments, the voltage provided by the voltage regulator 120 to the solenoid driver circuitry 130 from the flyback charging circuitry 160 may be above the power supply 110 voltage.

Figure 2:
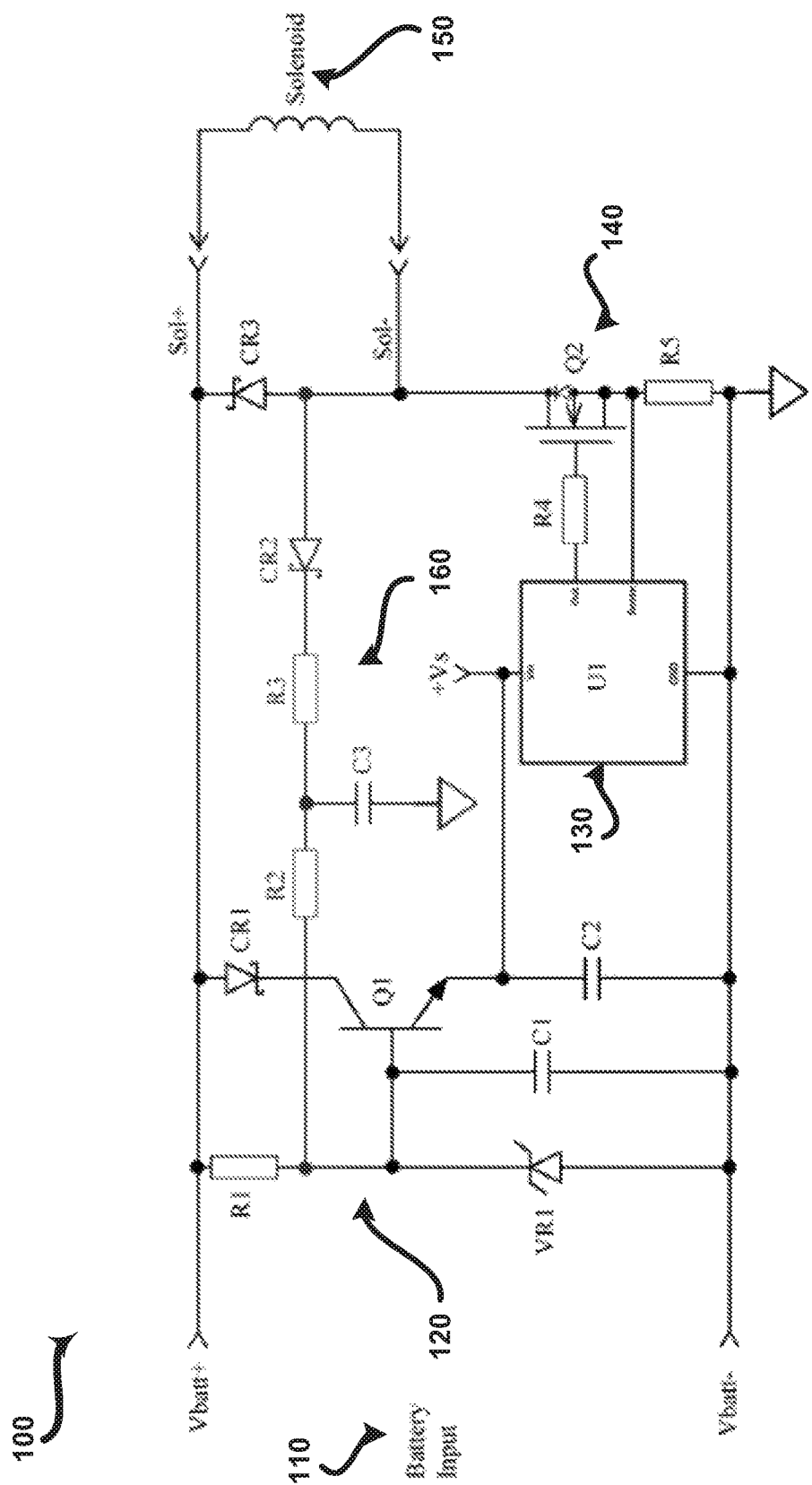
FIG. 2 is a circuit diagram of an exemplary solenoid system using solenoid flyback to provide a solenoid driver power supply in accordance with various embodiments.

FIG. 2 is a circuit diagram of an exemplary solenoid system 100 using solenoid flyback to provide a solenoid driver 130 power supply in accordance with various embodiments. Referring to FIG. 2, the solenoid system 100 comprises a power source 110, voltage regulator circuitry 120, solenoid control circuitry 130, solenoid switching circuitry 140, a solenoid 150, and flyback charging circuitry 160. The power source 110 may be any suitable battery operable to provide a direct current (DC) voltage to the solenoid 150 and the voltage regulator circuitry 120. The power source 110 may be configured to start and/or stop providing the voltage in response to a received control signal, such as a button or switch activation associated with the starting or stopping of an engine of a vehicle or generator.

The voltage regulator circuitry 120 is configured to receive the DC voltage from the power source 110 or the flyback charging circuitry 160 and provide a constant voltage level as an input to the solenoid control circuitry 130. The voltage regulator circuitry may regulate the voltage from the power source 110 and/or flyback charging circuitry 160 using a shunt regulator, such as a Zener diode VR1. Resistors R1 and/or R2 may provide power from the battery 110 and/or flyback charging circuitry 160, respectively, to the Zener diode VR1. For example, the voltage regulator circuitry 120 is configured to use the larger voltage from the power source 110 or the flyback charging circuitry 160. The voltage +Vs provided to the solenoid control circuitry 130 may be generated by the Zener diode VR1 and a transistor Q1, such as an NPN bipolar junction transistor (BJT) or any suitable transistor. Capacitor C1 may be provided to filter the regulated voltage provided to the solenoid control circuitry 130. Capacitor C2 may be provided to suppress a current spike that may occur each time the switching circuitry 140 is turned on. A diode CR1, which may be a Schottky diode or any suitable diode may be provided between the collector of the transistor Q1 and the battery voltage Vbatt+ to prevent the input voltage +Vs to the solenoid control circuitry 130 from being depleted when the battery voltage Vbatt+ is less than the solenoid control circuitry input voltage +Vs.

The solenoid driver 130 may be an integrated circuit configured to drive the solenoid 150. For example, the solenoid driver 130 may include comparators, a gate driver integrated circuit, and a pulse width modulation current controller for solenoids, among other things. The solenoid control circuitry 130 may control the current provided to the solenoid 150 using pulse width modulation. For example, the solenoid control circuitry 130 may provide pulse width modulation signals to the solenoid switching circuitry 140 for switching the solenoid switching circuitry 140 on and off. The solenoid switching circuitry 140 may comprise a transistor Q2, such as an n-type metal-oxide-semiconductor field-effect transistor (MOSFET) or any suitable transistor that is switched in response to signals provided by the solenoid driver circuitry 130 via a resistor R4. The solenoid switching circuitry 140 may provide feedback to the solenoid control circuitry 130 related to current sensed at resistor R5 of the solenoid switching circuitry 140. The solenoid control circuitry 130 may compare the sensed current feedback with current thresholds to determine when to provide the pulse width modulation signals for turning on and/or off the transistor Q2 of the solenoid switching circuitry 140.

The solenoid 150 may include one or more electromagnetically inductive coils wound around a steel or iron armature or plunger that moves linearly into and out of the center of the coil(s). The solenoid 150 energizes when the transistor Q2 of switching circuitry 140 is closed and current is flowing down from the positive terminal of the voltage source Vbatt+ through the solenoid 150. When the transistor Q2 of the switching circuitry 140 is opened, the voltage at Sol− may spike well above Vbatt+ for the short time it takes flyback diode CR3 to begin conducting due to the resonance created by the inductance of the solenoid 150 and the capacitance of diode CR3 and transistor Q2 of switching circuitry 140. The voltage created by the solenoid 150 at Sol− is a sudden voltage spike seen across the inductive load of the solenoid 150 when the supply current is interrupted. Flyback diode CR3, which may be a Schottky diode or any suitable diode, is used to suppress the sudden voltage spike, which may be referred to as a flyback voltage spike, inductive spike, and/or transient spike, among other things.

The flyback charging circuitry 160 includes a capacitor C3 configured to charge in response to the flyback voltage spike created by the solenoid 150 at Sol− each time the current being provided to the solenoid 150 is interrupted by the transistor Q2 of the solenoid switching circuitry 140 turning off as controlled by the solenoid driver circuitry 130. The flyback voltage spike charges capacitor C3 of the flyback charging circuitry 160 through diode CR2 and current limiting resistor R3 to voltages well above the voltage of battery 110. In various embodiments, capacitor C3 may be charged to approximately 16.0 Volts to 22.0 Volts with a 12.0 Volt battery 110. In certain embodiments, capacitor C3 may be charged to approximately 10.0 Volts to 13.0 Volts with a 4.5 Volt battery 110. The exemplary voltage ranges may be dependent on the solenoid characteristics, the characteristics of the flyback diode CR3, the characteristics of the field effect transistor (FET) Q2 of switching circuitry 140, and the drive currents. Each time the transistor Q2 of the switching circuitry 140 turns off and the solenoid 150 generates the flyback voltage spike, the voltage stored at capacitor C3 of flyback charging circuitry 160 may increase. The voltage regulator 120 may use the voltage stored at capacitor C3 of the flyback charging circuitry 160 to power the solenoid driver circuitry 130 once the capacitor C3 is charged to a voltage greater than the voltage provided by the battery 110. In various embodiments, the voltage provided by the voltage regulator 120 to the solenoid driver circuitry 130 from the capacitor C3 may be above the battery 110 voltage.

Various embodiments allow the use of standard solenoid driver integrated circuits 130 rated for a minimum of 5 Volt operation while using few voltage regulator circuitry 120 parts. Aspects of the present disclosure describe powering the solenoid driver integrated circuit 130 using some of the wasted energy of the solenoid flyback recovered with the flyback charging circuitry 160. Small surface mount parts may be used in the flyback section 160 to enable putting the electronics 120, 130, 140, 160 on the end cap of the solenoid 150 due to the high efficiency of the solenoid system circuit 100. In certain embodiments, standard low cost components are used to construct the solenoid system 100.

The solenoid system 100 illustrated in FIG. 2 shares various characteristics with the solenoid system 100 illustrated in FIG. 1 as described above.

Figure 3:
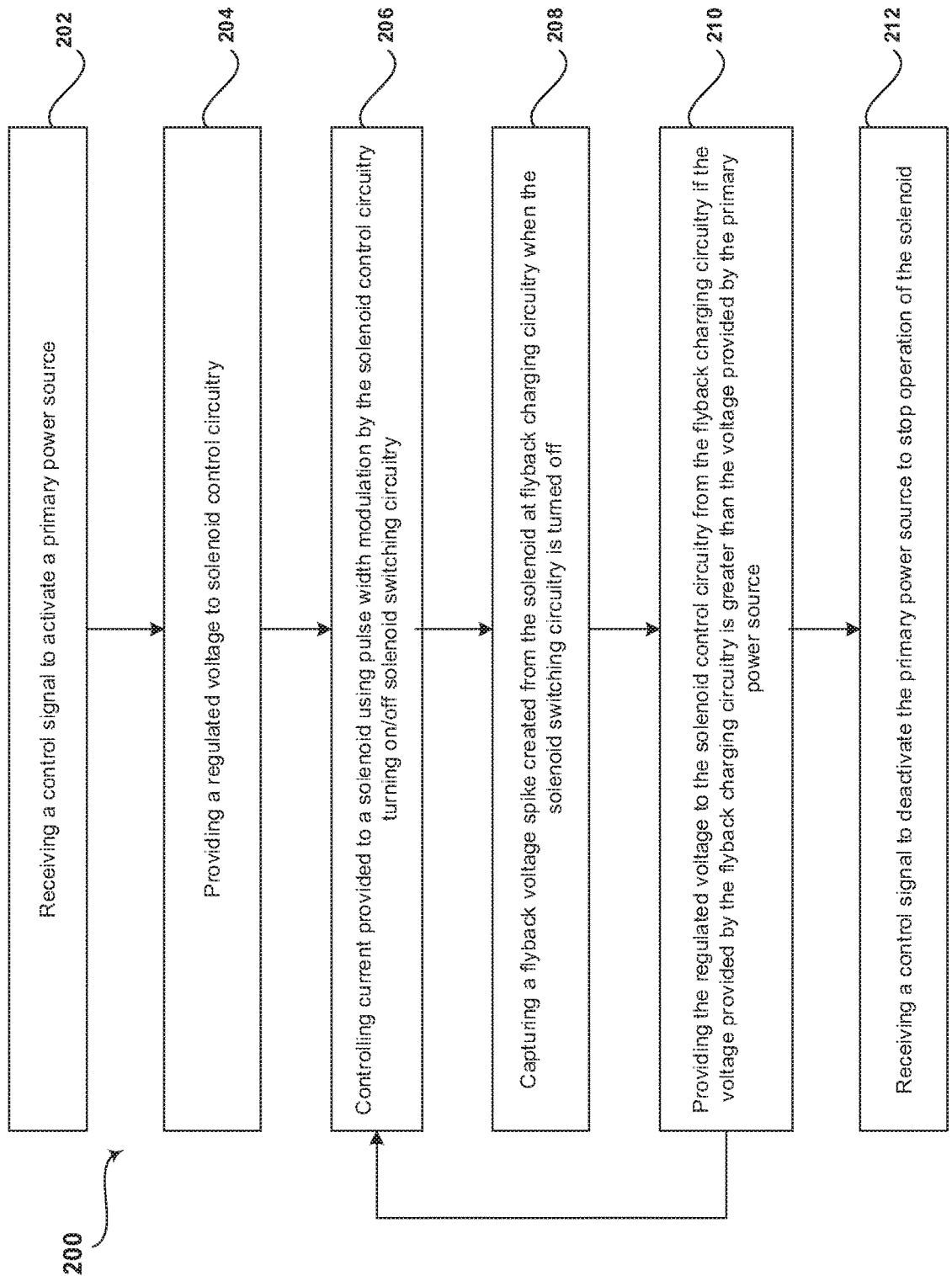
FIG. 3 is a flow diagram that illustrates exemplary steps for operating a solenoid using solenoid flyback to provide a solenoid driver power supply in accordance with various embodiments.

FIG. 3 is a flow diagram 200 that illustrates exemplary steps 202-212 for operating a solenoid 150 using solenoid flyback to provide a solenoid driver 130 power supply in accordance with various embodiments. Referring to FIG. 3, there is shown a flow chart 200 comprising exemplary steps 202 through 212. Certain embodiments of the present disclosure may omit one or more of the steps, and/or perform the steps in a different order than the order listed, and/or combine certain of the steps discussed below. For example, some steps may not be performed in certain embodiments. As a further example, certain steps may be performed in a different temporal order than listed below, including but not limited to simultaneously. Although the method is described with reference to the exemplary elements of the systems described above, it should be understood that other implementations are possible.

At step 202, a control signal for activating a primary power source 110 is received. For example, a primary power source 110, which may be a DC battery or any suitable battery, can receive a signal for turning on a solenoid system 100. In various embodiments, the signal may be from a button or switch at a vehicle or generator control panel that corresponds with starting an engine of the vehicle or generator.

At step 204, a regulated voltage is provided to solenoid control circuitry 130. For example, a resistor R1 may provide power from the battery 110 to a diode VR1 of voltage regulator circuitry 120. A voltage +Vs provided to the solenoid control circuitry 130 may be generated by the diode VR1 and a transistor Q1 of the voltage regulator circuitry 120. The diode VR1 and transistor Q1 of the voltage regulator circuitry 120 are configured to provide a constant voltage level +Vs to the solenoid control circuitry 130.

At step 206, the solenoid control circuitry 130 may control current provided to the solenoid 150 by turning on and off solenoid switching circuitry 140. For example, the solenoid driver 130 may be an integrated circuit configured to drive the solenoid 150 using pulse width modulation signals for switching a transistor Q2 of the solenoid switching circuitry 140 on and off. The solenoid switching circuitry 140 may include a resistor R5 for sensing a current that is provided as feedback back to the solenoid control circuitry 130. The sensed current feedback may be compared by the solenoid driver 130 with current thresholds to determine when to provide the pulse width modulation signals for turning on and/or off the transistor Q2 of the solenoid switching circuitry 140.

At step 208, a flyback voltage spike generated by the solenoid 150 when the solenoid switching circuitry 140 is turned off is captured at flyback charging circuitry 160. For example, the flyback charging circuitry 160 includes a capacitor C3 that charges using the flyback voltage spike created by the solenoid 150 when the transistor Q2 of the solenoid switching circuitry 140 is turned off to interrupt the current being provided to the solenoid 150. The flyback voltage spike may charge the capacitor C3 of the flyback charging circuitry 160 through a diode CR2 and current limiting resistor R3. The voltage stored at capacitor C3 of flyback charging circuitry 160 may increase each time the solenoid 150 generates the flyback voltage spike in response to the transistor Q2 of the switching circuitry 140 being turned off to stop the current flowing to the solenoid 150.

At step 210, the voltage regulator circuitry 120 provides a regulated voltage to the solenoid control circuitry 130 from the flyback charging circuitry 160 if the voltage provided by the flyback charging circuitry 160 is greater than the voltage provided by the primary power source 110. For example, the voltage regulator 120 may use the voltage stored at capacitor C3 of the flyback charging circuitry 160 to power the solenoid driver circuitry 130 once the capacitor C3 is charged to a voltage greater than the voltage provided by the battery 110. Steps 206 through 210 may be repeated during continued operation of the solenoid system 100.

At step 212, the solenoid system 100 receives a control signal to deactivate the primary power source 100 to stop operation of the solenoid 150. For example, the battery 110 may receive a signal for turning off the solenoid system 100. The signal may be from a button or switch at the vehicle or generator control panel that corresponds, for example, with stopping the engine of the vehicle or generator.

Various embodiments provide a solenoid system 100 comprising a solenoid 150, a primary power source 110, solenoid control circuitry 130, flyback charging circuitry 160, and voltage regulator circuitry 120. The primary power source 110 may be configured to provide a primary voltage Vbatt+ to at least the solenoid 150. The solenoid control circuitry 130 may be configured to control current provided to the solenoid 150. The solenoid 150 may generate a flyback voltage spike each instance the current provided to the solenoid 150 is interrupted as controlled by the solenoid control circuitry 130. The flyback charging circuitry 160 may be configured to charge in response to each instance of the flyback voltage spike. The voltage regulator circuitry 120 may be configured to provide a regulated supply voltage +Vs from the flyback charging circuitry 160 to the solenoid control circuitry 130 if the flyback charging circuitry 160 is charged to a secondary voltage that is greater than the primary voltage Vbatt+.

In an exemplary embodiment, the primary power source 110 is a battery. In a representative embodiment, the voltage regulator circuitry 120 is configured to provide the regulated supply voltage +Vs from the primary power source 110 to the solenoid control circuitry 130 if the primary voltage Vbatt+ is greater than the secondary voltage. In certain embodiments, the primary power source 110 is configured to provide the primary voltage Vbatt+ in response to an activation control signal. In various embodiments, the activation control signal corresponds with an instruction to start an engine of one of a vehicle or a generator. In an exemplary embodiment, the primary power source 110 is configured to stop providing the primary voltage Vbatt+ in response to a deactivation control signal. In a representative embodiment, one or both of the activation control signal and the deactivation control signal is provided by one or both of a button or a switch at one of a vehicle control panel or a generator control panel. In various embodiments, the deactivation control signal corresponds with an instruction to stop an engine of one of a vehicle or a generator.

In certain embodiments, the solenoid system 100 comprises a flyback diode CR3 configured to suppress the flyback voltage spike generated by the solenoid and provide continuous current flow in the solenoid 150. In an exemplary embodiment, the voltage regulator circuitry 120 comprises a Zener diode VR1 and transistor Q1 configured to provide the regulated supply voltage +Vs from one of the primary power source 110 or the flyback charging circuitry 160 based on which of the primary voltage Vbatt+ and secondary voltage is greater. In a representative embodiment, the solenoid control circuitry 130 is an integrated circuit rated for a minimum of 5 Volt operation. In various embodiments, the solenoid system 100 comprises a transistor Q2 configured to switch on and off to provide the current to the solenoid 150 in response to pulse width modulation signals provided by the solenoid control circuitry 130.

In a representative embodiment, the solenoid system 100 comprises a current sensing resistor R5. The current provided to the solenoid 150 is sensed by the current sensing resistor R5 and provided as feedback to the solenoid control circuitry 130. In certain embodiments, the solenoid control circuitry 130 is configured to compare the feedback of the sensed current with one or more current thresholds to determine when to provide the pulse width modulation signals for one or both of switching on and switching off the transistor Q2. In various embodiments, the flyback charging circuitry 160 comprises a capacitor C3 configured to charge through a diode CR2 and current limiting resistor R3 in response to each instance of the flyback voltage spike. In an exemplary embodiment, the solenoid system 100 comprises a diode CR1 between a collector of the transistor Q1 and the primary power source 110. The diode CR1 is configured to prevent the regulated supply voltage +Vs provided to the solenoid control circuitry 130 from being depleted if the regulated supply voltage +Vs is greater than the primary voltage Vbatt+.

In various embodiments, the battery 110 is a 12 Volt battery. In certain embodiments, the secondary voltage is from approximately 16.0 Volts to 22.0 Volts. In an exemplary embodiment, the battery 110 is a 4.5 Volt battery. In a representative embodiment, the secondary voltage is from approximately 10.0 Volts to 13.0 Volts.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" and "example" mean serving as a non-limiting example, instance, or illustration. As utilized herein, the terms "e.g." and "for example" set off lists of one or more non-limiting examples, instances, or illustrations.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment or embodiments disclosed, but that the present disclosure will include all embodiments falling within the scope of the appended claims.

What is claimed is:

1. A solenoid system comprising:
   a solenoid;
   a primary power source configured to provide a primary voltage to at least the solenoid;
   solenoid control circuitry configured to control current provided to the solenoid, wherein the solenoid generates a flyback voltage spike each instance the current provided to the solenoid is interrupted as controlled by the solenoid control circuitry;
   flyback charging circuitry configured to charge in response to each instance of the flyback voltage spike; and
   voltage regulator circuitry configured to provide a regulated supply voltage from the flyback charging circuitry to the solenoid control circuitry if the flyback charging circuitry is charged to a secondary voltage that is greater than the primary voltage.

2. The solenoid system of claim 1, wherein the primary power source is a battery.

3. The solenoid system of claim 2, wherein the battery is a 12 Volt battery.

4. The solenoid system of claim 3, wherein the secondary voltage is from approximately 16.0 Volts to 22.0 Volts.

5. The solenoid system of claim 2, wherein the battery is a 4.5 Volt battery.

6. The solenoid system of claim 5, wherein the secondary voltage is from approximately 10.0 Volts to 13.0 Volts.

7. The solenoid system of claim 1, wherein the voltage regulator circuitry is configured to provide the regulated supply voltage from the primary power source to the solenoid control circuitry if the primary voltage is greater than the secondary voltage.

8. The solenoid system of claim 7, wherein the voltage regulator circuitry comprises a Zener diode and transistor configured to provide the regulated supply voltage from one of the primary power source or the flyback charging circuitry based on which of the primary voltage and secondary voltage is greater.

9. The solenoid system of claim 8, comprising a diode between a collector of the transistor and the primary power source, wherein the diode is configured to prevent the regulated supply voltage provided to the solenoid control circuitry from being depleted if the regulated supply voltage is greater than the primary voltage.

10. The solenoid system of claim 1, wherein the primary power source is configured to provide the primary voltage in response to an activation control signal.

11. The solenoid system of claim 10, wherein the activation control signal corresponds with an instruction to start an engine of one of a vehicle or a generator.

12. The solenoid system of claim 10, wherein the primary power source is configured to stop providing the primary voltage in response to a deactivation control signal.

13. The solenoid system of claim 12, wherein one or both of the activation control signal and the deactivation control signal is provided by one or both of a button or a switch at one of:
   a vehicle control panel, or
   a generator control panel.

14. The solenoid system of claim 12, wherein the deactivation control signal corresponds with an instruction to stop an engine of one of a vehicle or a generator.

15. The solenoid system of claim 1, comprising a flyback diode configured to suppress the flyback voltage spike generated by the solenoid.

16. The solenoid system of claim 1, wherein the solenoid control circuitry is an integrated circuit rated for a minimum of 5 Volt operation.

17. The solenoid system of claim 1, comprising a transistor configured to switch on and off to provide the current to the solenoid in response to pulse width modulation signals provided by the solenoid control circuitry.

18. The solenoid system of claim 17, comprising a current sensing resistor, wherein the current provided to the solenoid is sensed by the current sensing resistor and provided as feedback to the solenoid control circuitry.

19. The solenoid system of claim 18, wherein the solenoid control circuitry is configured to compare the feedback of the sensed current with one or more current thresholds to determine when to provide the pulse width modulation signals for one or both of switching on and switching off the transistor.

20. The solenoid system of claim 1, wherein the flyback charging circuitry comprises a capacitor configured to charge through a diode and current limiting resistor in response to each instance of the flyback voltage spike.

* * * * *